United States Patent Office

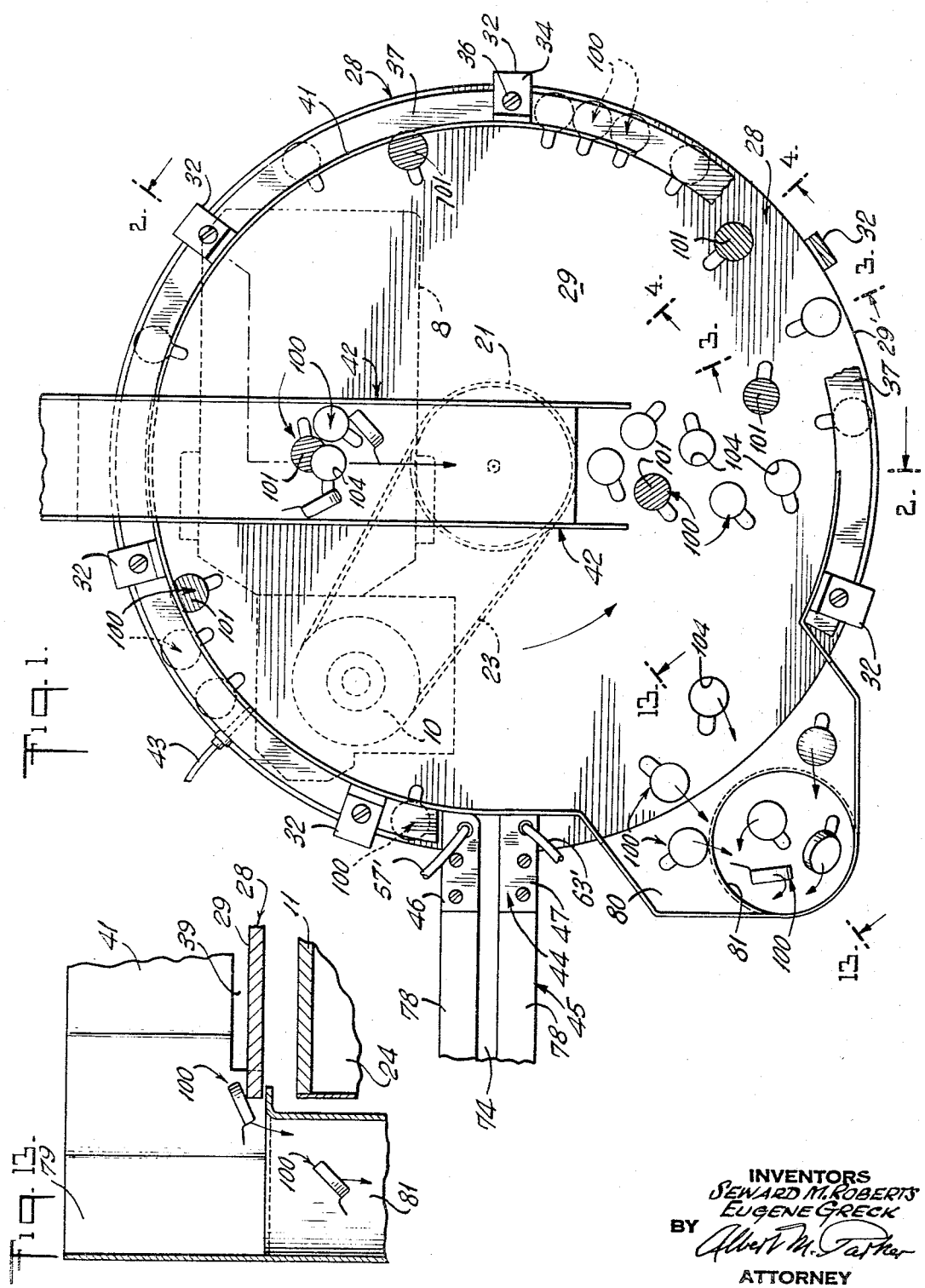

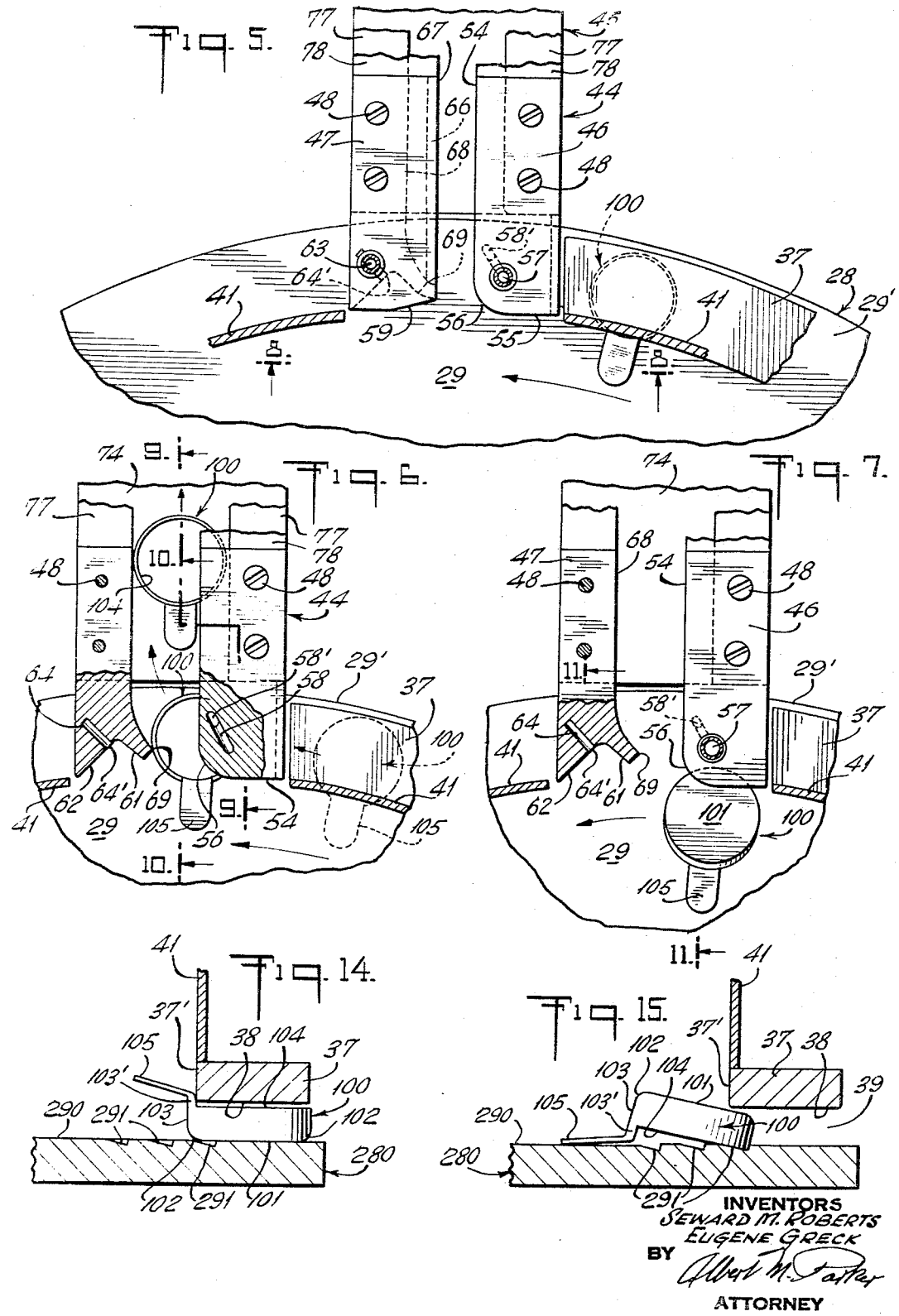

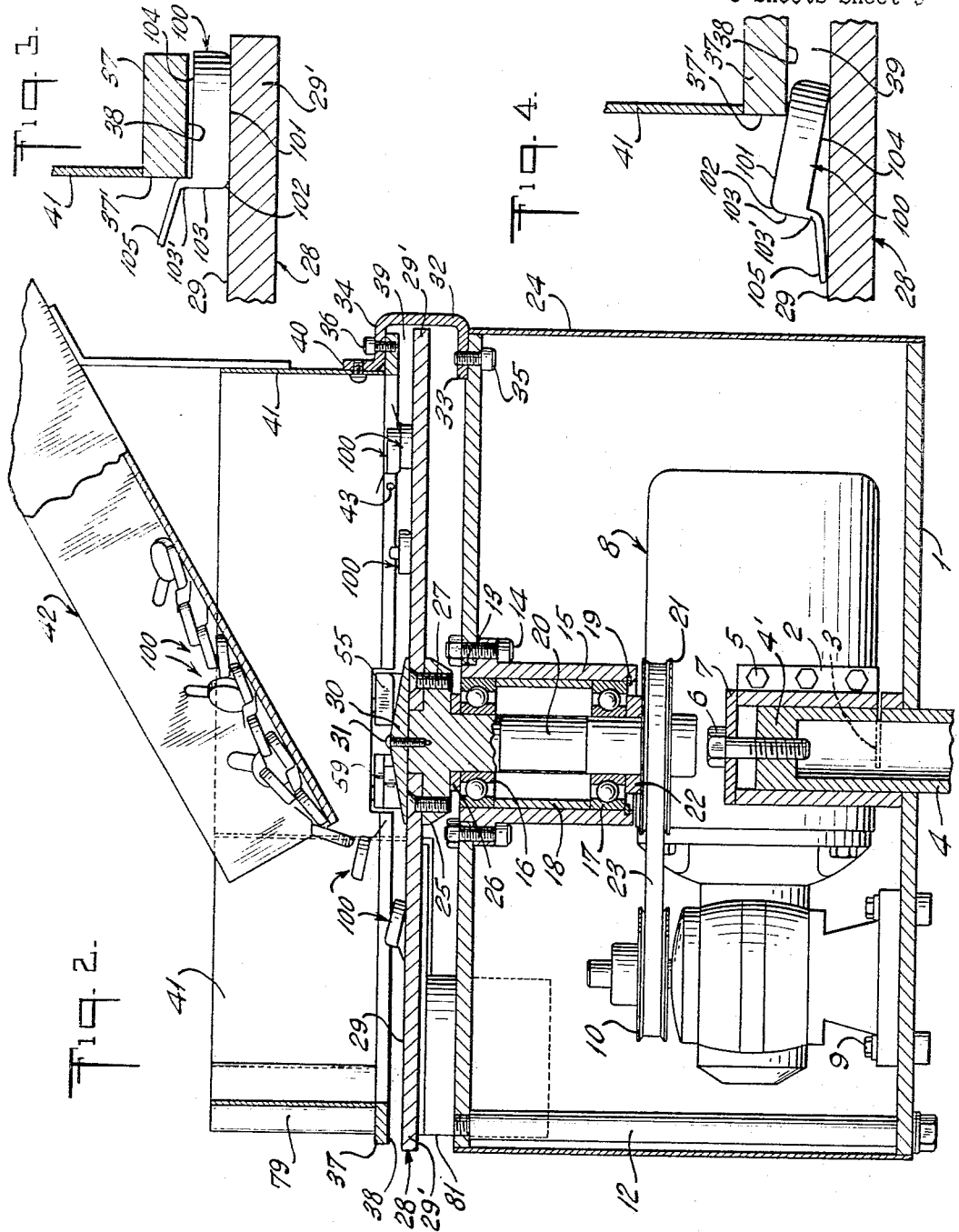

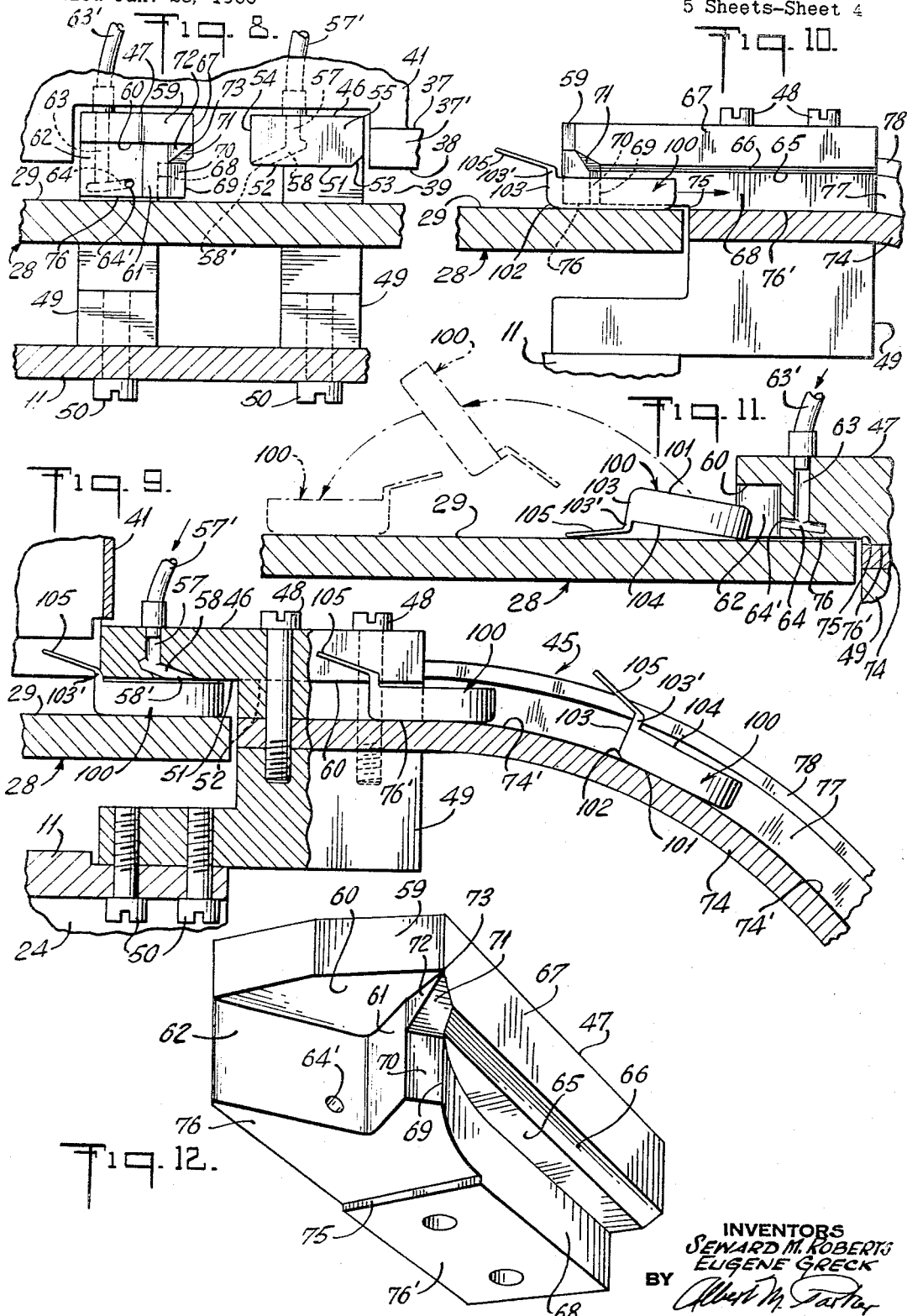

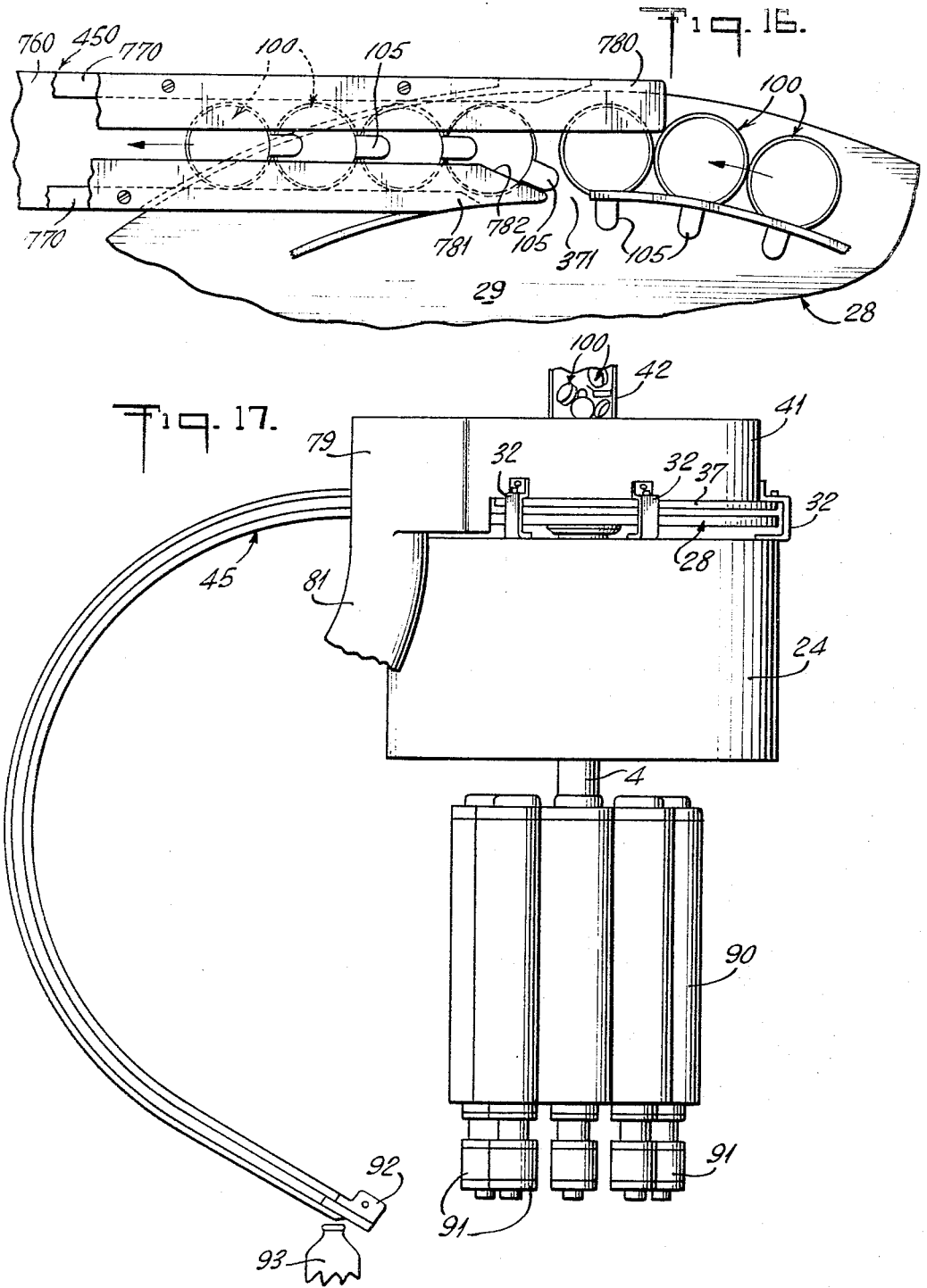

3,330,403
Patented July 11, 1967

3,330,403
METHOD AND APPARATUS FOR FEEDING ARTICLES
Seward M. Roberts, San Mateo, Calif., and Eugene Greck, Westfield, N.J., assignors to American Flange & Manufacturing Co., Inc., New York, N.Y., a corporation of Delaware
Filed Jan. 28, 1966, Ser. No. 523,792
2 Claims. (Cl. 198—33)

This invention relates to a method and apparatus for feeding articles and is particularly concerned with such a method and apparatus for high speed feeding of articles which are otherwise difficult to handle because of their shape and general physical characteristics.

A lightweight metal closure cap having a flat disc-like top surrounded by a cylindrical skirt and having a radial ear extending away from and with respect to the free edge of the skirt is illustrative of, but without limitation to, the type of article with the feeding of which the method and apparatus of this invention are concerned.

Various approaches have been made to solve the problem of feeding articles, such as those closure caps, at the speed required in automated production operations. To date, however, none has provided an answer that could be considered satisfactory. The most serious drawback of the prior art devices has been their inability to perform at speeds comparable to that of the equipment with which they are used. Even so they have generally been large, cumbersome and expensive apparatus. They have also been unduly complicated and have relied, for their operation, on critical relationships difficult to maintain on continuous production work. Thus any efforts to proceed along the established lines in an effort to get greater speed appear to promise more problems rather than solutions.

Another drawback of the prior art devices has been that they have tended to damage or at least detract from the appearance of the articles handled. Also such distortion of the products as has been caused by the equipment has tended to render the equipment somewhat inefficient in the handling of the articles.

Another definite disadvantage of the best of the prior art devices is that they reject and cause a recycling of a substantially greater portion of the articles then they orient and feed in the manner desired. This is, of course, mechanically undesirable and tends to detract from the appearance of the articles through the wear on their finish.

Another important consideration is the space needed for the article feeder and to how it must be positioned relative to the particular work station being fed. Known feeding devices operating at speeds high enough to be at all acceptable for feeding elements as here considered are cumbersome and do not readily satisfy the space and positioning consideration. Thus a real need exists for apparatus and method for feeding articles of the type here disclosed which is inexpensive in construction and operation, and is of small size and can be readily variously positioned. The apparatus and method of this invention meet this need, as well as overcoming other problems existing in the article feeding field, in providing for the orienting and feeding of lightweight unsymmetricals at a higher rate of speed then is heretofore been thought possible.

The feeding speed of properly oriented caps from the apparatus of the invention is such that the caps leave the apparatus on the way to the work station so fast they are individually indistinguishable and appear as a blur. Thus, for the first time, an orienting and feeding apparatus and method are presented which are capable of supplying caps from one simple unit to capping machinery at a rate suitably faster than normal capping machinery is capable of handling. Nevertheless this is accomplished with orienting and feeding apparatus of the utmost simplicity which is economical to construct and to operate. Furthermore it orients and feeds out the caps so fast that so long as the input of unoriented caps into the apparatus is not unreasonably in excess of what the apparatus is capable of handling the recycling of improperly and reversely oriented caps is a mere trickle compared to the full, fast, flow of the oriented caps fed from the apparatus. Besides being of high economy and efficiency, the small size and light weight of the apparatus is such that it needs no floor space but can be advantageously positioned in space not otherwise used in close association above or about the work station being fed.

It is accordingly a principal object of this invention to provide a new and improved method for orienting and feeding articles.

Another object is to provide apparatus for carrying out that method.

Another object is to provide a method and apparatus for feeding and orienting unsymmetrical articles at high speed.

A further object is to provide a method and apparatus for feeding cup shaped articles having a radially extending ear so that all the articles fed are similarly oriented.

A still further object is to provide a method and apparatus for feeding unsymmetrical closure caps at high speed.

Still another object is to provide such apparatus which is extremely simple in construction, compact in size and low in cost.

A more detailed object is to provide such apparatus capable of being mounted in a unique manner as an integral part of otherwise conventional bottle capping machinery.

Further and more detailed objects will be partly obvious and partly pointed out as the description of the invention, taken in conjunction with the accompanying drawing proceeds.

In that drawing:

FIG. 1 is top plan view of the article feeder in accordance with the invention and for carying out the method thereof with a portion of the feeder broken away for clarity;

FIG. 2 is a vertical section taken on line 2—2 of FIG. 1 and looking in the direction of the arrows but with the drive unit rotated 90° for greater clarity;

FIG. 3 is an enlarged fragmentary vertical section taken on line 3—3 of FIG. 1 and looking in the direction of the arrows;

FIG. 4 is an enlarged fragmentary vertical section taken on line 4—4 of FIG. 1 and looking in the direction of the arrows;

FIG. 5 is an enlarged fragmentary top plan view of the article discharge station employed in the principal embodiment of the invention;

FIG. 6 is a view similar to FIG. 5 but partially broken and showing a properly oriented article being discharged.

FIG. 7 is a view similar to FIG. 6 but showing an improperly oriented article being rejected;

FIG. 8 is a fragmentary vertical section taken on line 8—8 of FIG. 5 and looking in the direction of the arrows;

FIG. 9 is a fragmentary vertical section taken on line 9—9 of FIG. 6 and looking in the direction of the arrows;

FIG. 10 is a fragmentary vertical section taken on line 10—10 of FIG. 6 and looking in the direction of the arrows;

FIG. 11 is a fragmentary vertical section taken on line 11—11 of FIG. 7 and looking in the direction of the arrows;

FIG. 12 is a perspective view of one part of the article discharge means;

FIG. 13 is a fragmentary vertical section taken on line 13—13 of FIG. 1 and looking in the direction of the arrows;

FIGS. 14 and 15 are fragmentary vertical sections respectively similar to FIGS. 3 and 4 and showing a modified form of the invention;

FIG. 16 is a top plan view of a modified article discharge arrangement; and

FIG. 17 is an elevational view of an article feeder in accordance with the invention showing the same as mounted above the crowner housing of a bottle capping machine.

Looking first at FIG. 2 for consideration of the overall construction of the article orienting and feeding apparatus of the invention, the bottom element of the apparatus is a base plate 1 to the upper surface of which about a center opening therethrough is secured a generally cylindrical split clamp 2. The clamp 2 is split more than half the way across as seen at 3 to provide sufficient resilience to enable it to be tightened about the upper end of a fixed supporting shaft 4 by means of the bolts 5. A bolt 6 extends through an end plate 7 at the upper end of the clamp and extends down to threadedly engage a tapped hole in the upper end 4' of the shaft 4. Accordingly vertical adjustment of the clamp 2 and base plate 1 is effected by turning the bolt 6.

A motor and speed reducing unit 8 is bolted at 9 to the base plate 1. The output shaft of the motor is fitted with a pulley 10 to receive a belt for driving another pulley as will appear.

An upper plate 11 is supported on and above base plate 1 by means of a plurality of spacer rods one of which is shown at 12 in FIG. 2. The plate 11 has a central opening 13 therethrough within which the upper end of a bearing housing 15 is secured by means of bolts 14. Inside the housing 15 is an upper bearing 16, a lower bearing 17 and an intermediate spacer sleeve 18 extending between the bearings. A snap ring 19 seated in an internally opening recess in the housing 15 below the bearing 17 retains the bearings of sleeve within the housing 15. A drive shaft 20 is rotated when mounted within the bearings 16 and 17 and is fitted at its lower end with a drive pulley 21 spaced from bearing 17 by washer 22. The pulley 21 is drivingly connected to the pulley 10 by means of a drive belt 23. The driving mechanism thus far described is enclosed by wall 24 extending between and connecting the peripheries of upper plate 11 and face plate 1.

The upper end portion of shaft 20 is circumferentially enlarged into a collar 25 which collar is spaced above the bearing 16 by a washer 26. A flat circular turntable 28 having a center opening which receives the upper end of shaft 20 seats down on and is secured to collar 25 by means of screws 27. The turntable 28 is provided with an upwardly facing article receiving surface 29. A flat conical end plate 30 overlies the screws 27 and is secured to the end of shaft 20 by screw 31. Thus the turntable 28 will turn with the shaft 20 at the speed imparted by the motor through pulleys 10 and 21.

A series of channel shaped brackets having bases 32, lower legs 33 and upper legs 34 are spaced about the periphery of upper plate 11. The lower bracket legs 33 are secured to the periphery of the upper surface of the plate 11 by screws 35 with the channel bases positioned outward so that an outer peripheral band indicated by numeral 29' of the turntable 28 is received within and rotates within the bracket channel. A circular rail 37 is secured by screws 36 to the under surface of the upper bracket legs 34. The rail 37 has a downwardly facing under surface 38 vertically spaced, as indicated by numeral 39, above the peripheral band 29' of the article receiving surface 29 of the turntable 28. The upper bracket legs 34 are also formed with upwardly extending feet 40 which support an upstanding cylindrical enclosing wall 41. Extending down at an incline within the wall 41 and to a position adjacent the turntable surface 29 is an article entrance chute 42 which feeds articles from a bulk supply (not shown) on to the surface 29.

The particular article herein shown and described as being oriented and fed by the method and apparatus of the invention is a lightweight metal closure cap. However the invention is not to be construed as limited thereto since other and different types of articles could be advantageously oriented and fed without departing from the scope of the invention. The cap, generally indicated by numeral 100, comprises a cupped body portion having a flat bottom panel 101 surrounded by a radiused corner portion 102 extending into a cylindrical skirt 103 as clearly seen in FIGS. 3 and 4. The wall 103 terminates in a free edge 104. An ear 105 extends from the free edge 104, first in a short continuing portion 103' of the skirt and then radially outwardly and diagonally upwardly. This particular compound extension of the ear is not however, necessary to proper operation of the apparatus. Any ear extension imparting a tilt such as seen in FIG. 4 to the cap when reversely oriented cup down would be adequate.

Looking at FIGS. 1 to 4 it can be seen that, as the caps 100 are deposited on the upper surface 29 of the turntable 28, which as shown in FIG. 1 is rotating in a counterclockwise direction, they are subjected to a centrifugal force of sufficient magnitude to propel them radially outwardly against the rail 37 as they tend to be transported in a circular path. This centrifugal force is sufficient, if, for example, the caps are deposited on a 24 inch diameter turntable rotating in the speed range of 60 r.p.m. The turntable could be formed with a conical upper surface sloping downwardly toward its periphery, to aid in imparting radial movement to the caps.

Upon contacting the rail 37 the caps 100 will be conveyed by the turntable 28 in a circular path while under the influence of the centrifugal force. During this travel those caps positioned with their cupped side up will be selected by having their body portions slide into the space 39 provided to receive them underneath the rail 37 with the free edge 104 of the cylindrical skirt 103 just clearing the under surface 38. Once the ear 105 comes against the inner face 37' of the rail 37 the outward movement of the cap will be stopped, but the centrifugal force acting upon the cap will cause it to swing fully radially outwardly into the space 39 with only the ear 105 remaining radially inwardly of the rail. Thus oriented, as seen in FIG. 3, the cap body is held by centrifugal force within the space 39 by the vertical extent of the ear 105 as the cap continues around in a circular path at the periphery of the turntable.

In FIG. 4 it can be seen how the caps positioned with their cupped formation facing down are partially elevated by the ear 105 so that the body portion can extend only a slight amount into the space 39. Nevertheless, such caps, as well as those properly positioned, are conveyed in a circular path adjacent rail 37 but comparing FIGS. 3 and 4 it can be seen that only caps properly positioned cup side up are able to move out to the outer periphery of that path.

Since caps introduced through the chute 42 may be nested within each other provision must be made for separating them. To accomplish this an air jet means 43 (FIGS. 1 and 2) is positioned within the rail 37, so as to blow an air blast just over the top of caps forming a single layer. When, however, a pair of nested caps passes in front of the air jet 43, as shown in FIG. 1, the uppermost cap will be blown off, propelled inwardly, and recycled on the turntable.

As the caps 100 continue to be conveyed by the turntable 28 they arrive at the cap discharge station, generally indicated at 44, through which the properly oriented caps underlying the rail 38 are removed from the turntable and fed in oriented position into the discharge track 45. The discharge station 44, as shown in detail in FIGS. 5 to 12, comprises a pair of spaced apart parallel guide blocks 46 and 47 extending radially outwardly from and with respect to the turntable 28. The blocks 46 and 47 are secured by a plurality of screws 48 to a bracket 49 which in turn is secured to the upper surface of the plate 11 by screws 50. The inner end of the block 46 is undercut providing a top surface 51 lying in the plane of the lower rail surface 38. The surface 51 overlies the peripheral portion of the turntable, so that the undercut forms a continuation of the space 39.

The side 54 of the block 46 bordering the discharge track is also undercut providing a top surface 52 forming a continuation of the end undercut surface 51. A short portion of the surface 51 is chamfered off adjacent the rail 37 as indicated at 53 (FIG. 8) to facilitate smooth movement of the caps into the discharge station. The track bordering side 54 and the inner end surface 55 of the block 46 are joined by a radiused portion 56 also to insure smooth movement of caps.

An air hose 57' connects with a vertical bore 57 in the block 46. The bore 57 communicates in turn with an air outlet bore 58 extending diagonally downwardly across the radiused portion 56 and opening through the surface 51 at 58', a short distance along the track from the end 55 of the block 46 so as to direct a jet of air into caps entering the track.

The guide block 47 is formed with a radially inwardly opening undercut pocket in its inner end 59 (FIGS. 5, 8, 11 and 12). That pocket has a horizontal top surface 60 and an end wall made up of wall portions 61 and 62 disposed at right angles to each other. An air hose 63' connects with vertical bore 63 which extends for almost the full depth of the block 47 then communicates with an inclined bore 64 extending parallel to the inner wall portion 61 and slightly upwardly to open out of the outer wall portion 62 at 64' just above the bottom edge thereof. This arrangement creates an inwardly and upwardly directed air stream from the end 64' of the bore 64 substantially parallel to the plane of the inner wall 61. This air stream from the end 64' starts low enough to act upon the skirts 103 of reversely positioned caps to blow the caps inwardly over the turntable while flipping a good portion of them over.

The side 67 of the block 47 bordering the discharge track is undercut to provide a horizontal surface 65 having a relieved edge portion 66. The vertical wall 68 resulting from the undercut, meets the vertical end 70 of the wall in back of the surface 61 at a sharp vertical cap deflecting edge 69. This edge deflects properly oriented caps into the discharge track.

In order to further facilitate unimpeded cap movement through the discharge station 44, the upper edge of end surface 70 merges into an upwardly and outwardly inclined surface 71 which, together with a small vertical side surface 72, tapers to a point 73 forming the lower end of the line where the side surface 67, and end surface 59 intersect.

As seen in FIGS. 11 and 12 the block 47 has a bottom wall 75' stepped upwardly at 75 to the horizontal surface 76. This stepped arrangement provides for running clearance of the turntable 28 underneath the front end portion of the block 47 and also facilitates smooth cap movement by causing the cap to step down slightly onto the track surface 74 of the track base 74'. The exit track 45 is further shown as comprising a pair of side rails 77 and a pair of retaining plates 78 which together with the base surface 74 form a conduit through which the properly oriented, ear trailing caps may be conveyed to a subsequent work station. The screws 48, as seen in FIG. 9, extend through the track base 74' as well as the block 46 and 47 so as to mount the base 74' on the bracket 49.

The primary function of the cap discharge station is to discharge the properly oriented caps from the rotating turntable into the exit track and to direct those caps reversely positioned away from the discharge station for recycling on the turntable. Thus caps properly positioned cup side up, are conveyed along the outer peripheral path 29' with their body portions underneath the lower rail surface 38 and their ears 105 extending radially inwardly. These fully oriented caps continue this movement until their body portions lie underneath the horizontal surface 51 formed by the undercut in the guide block 46, as illustrated in FIGS. 6 and 9. Continued circumferential movement of the properly oriented cap causes the cylindrical cap skirt 103 to contact the cap deflecting edge 69 on guide block 47. The resulting line contact on the skirt 103 is seen in FIG. 6 as being spaced slightly radially inwardly of the cap body center line so that the cap is urged in a radially outward direction. At the same time, the air jet directed into the cap body through bore 58 becomes effective to propel the cap radially outwardly through the discharge station and into the exit track 45. Rapid and smooth movement of the cap under the influence of the air jet directed through bore 58 is enhanced first of all by the radiused portion 55 on block 46 which guides the cap ear 105 as it moves from its circumferential path into the radial exit path. The inclined surface 71 on block 47 also acts to guide the ear 105 into the discharge path in those instances where the cap, as seen in FIG. 6, starts to rotate in a clockwise direction.

Finally the relieved edge portion 66 on block 47 permits the free edge 104 of the cap skirt 103 to move smoothly under the horizontal undercut surface 65 as the cap is propelled by the air jet directed through bore 58. The properly oriented caps are thus discharged from the upper turntable surface 29 in a controlled manner without time lag or hesitation. It should be also noted, that, if for any reason, such as a jam at the work station being fed, it is desired to clear the exit track of caps, the flow in the track can be reversed and the caps pushed manually back out onto the turntable. This advantageous reversibility feature is difficult to achieve in the feeding of unsymmetrical parts yet is easily accomplished here due to the simplicity of the above described discharge station.

Now directing attention to FIGS. 7 and 11 and the rejection at the discharge station of caps facing cupped side down. As mentioned earlier these reversely positioned caps are also carried around in a circular path by the turntable 28, however the circle of their path as seen in FIG. 1 is smaller than that of the peripherally disposed properly oriented caps. This is because, as seen in FIG. 4, such caps can only fit a short distance into the space 39 beneath the rail 37. Upon coming around to the exit guide block 46 the reversely positioned caps will not fit under the upper surface 51 of the inner undercut end of block 46 any more than they would fit under the rail 37', instead the cap positioned cupped side down is held radially inwardly from the air jet directed through bore 58 and continues to move circumferentially into the air stream created by the air jet directed out of the bore 64 in block 47. The effect of this air stream on the reversely positioned caps is to blow them back toward the central area of the turntable for recycling. As illustrated in FIG. 11, and previously pointed out this is advantageously accomplished while at the same time flipping a major portion of these caps over into the desired cupped side up position. This cup flipping action results from the upwardly directed air which lifts the caps up off of the turntable surface 29. Then the caps, aided by the placement of their own center of gravity, usually land cupped side up. This feature greatly increases overall efficiency of the apparatus since caps initially rejected by the discharge station are properly positioned and recycled again right on the turntable. The air stream is effective then not only to clear reversely positioned caps away from the discharge station but, in addition, to position those initially rejected caps so as to be selected and oriented for discharge at the discharge station on recycling.

As seen in FIG. 6 the pocket wall 61 acts as a shield to protect properly oriented caps from the effect of the air stream directed through the bore 64. With this arrangement only properly oriented caps are acted upon by the air jet directed through bore 58 while only reversely positioned caps are acted upon by the air jet directed through bore 64.

Inasmuch as it is not practical to bulk dispense caps onto the turntable at the exact feed rate required at the work station being fed, a continuous high feeding rate is most satisfactorily achieved by depositing caps onto the turntable at a slightly greater rate then is called for by the work station. An overfeed outlet is accordingly provided and, as seen in FIGS. 1 and 13, comprises a gap in the rail 37 just beyond the exit station 44 in the direction of turntable rotation. The enclosing wall 41 has an outwardly extending compartment 79 which coincides with the rail gap and is provided with a bottom wall 80 having an open duct 81 extending downwardly therefrom. In the event the turntable 28 becomes overloaded the excess variously positioned caps, upon reaching the discharge station 44, will constitute a sufficient mass to simply push through the air stream directed through the bore 64. Thus upon reaching the compartment 79, they will spill off the edge of the turntable into the duct 81 through which they are directed back to the bulk supply source for complete recycling.

Summarizing the operation of the article feeding and orienting apparatus and method thereby practiced, the various positioned caps 100 are first deposited onto the upper surface 29 of the rotating turntable 28. The caps are rotated on the turntable and the resulting centrifugal force acting upon the caps moves them radially outwardly against the rail 37 along which they are initially conveyed in a circular path by the turntable. The body portions of caps positioned cupped side up slide underneath the rail 37 into the space 39 and are thus conveyed at the outer periphery of the circular path. The remainder of the caps positioned cupped side down cannot slide under the rail because they are cocked upwardly by their ears 105. Consequently they are conveyed in the circular path radially inwardly of the properly oriented caps.

Upon reaching the discharge station 44, the properly oriented caps continue, due to the centrifugal force, into the undercut beneath the surface 51 of guide block 46. There they are acted upon by the air jet directed through bore 58 which propels these caps rapidly radially outwardly through the discharge station and into the track 45. The caps positioned cupped side down cannot slide under the block 46 any more than they can slide under the rail 37 so they are not affected by the air jet directed through bore 58. Instead they are conveyed on into the air stream created by the air jet directed through bore 64. This causes the cupped side down caps to be blown away from the discharge station and at the same time a large percentage are flipped over into a cupped side up position ready for recycling on the turntable. Overfed caps, that is, caps deposited on the turntable in excess of the feeding rate required by the work station being fed, are pushed through the air stream and are spilled off of the turntable into the duct 81 for complete recycling.

From the foregoing it will be quite apparent that the objects of the invention are achieved by the disclosed apparatus, for in the first place, orienting of the caps is accomplished by merely the utilization of a turntable with a rail positioned above the periphery thereof and spaced a selected distance above the upper surface of the turntable. This simple arrangement of elements, in itself, picks up the properly oriented caps which are discharged easily and smoothly to a discharge station where a single jet of air sends them rapidly on their way along the exit track. Improperly oriented caps cannot go down that track nor can they create a jam-up to the entrance to the discharge station. This is taken care of by another jet of air which, besides blowing them away, tends to position most of them for immediate selection and orienting. Throughout the whole of the operation both the properly oriented and improperly oriented caps are handled so lightly that distortion of them or marring of their surfaces to disturb their appearance are well guarded against. However, from extensive tests that have been run on the apparatus it has been found that it is practically fool-proof and operates continuously at speeds much in excess of those attainable by any prior art apparatus.

A somewhat modified turntable is indicated generally at 280 in FIGS. 14 and 15. Here the upper article receiving surface 290 is provided with a series of circumferential grooves 291, the number of which can be increased or decreased from the three here shown without departing from the scope of the invention. When viewed in vertical cross section the grooves 291 appear as a series of teeth and act as such on any caps positioned the cupped side down to prevent them from being jammed in underneath the rail 37. The grooves do this by engaging the free skirt edge 104 of these caps as they tend to move radially outwardly and restrict that movement. The caps properly positioned cupped side up however, due to the radiused portions 102, and flat bottom, slide unimpeded over the grooves 291 and into position underneath the rail 37 being checked in that position only by their trailing ears 105.

A modified form of discharge station is shown in FIG. 16. Here the caps 100 are discharged from the turntable in a tangential path instead of a radial path as in the principle embodiment. To achieve this the circular rail 370, overlying the peripheral portion of turntable 28, is like the rail 37 of the preferred form but here there is a gap 371 in the rail 370 from which the tangential exit track 450 extends. The track 450, like that in the principle embodiment, comprises a base 760, a pair of side rails 770 and a pair of retaining plates 780 and 781. The inner end of the plate 781 is formed with a cam surface 782 on its inner face. The properly oriented caps are conveyed with their cap bodies underneath the rail 370. Upon reaching the exit station, their ears 105 are momentarily freed as the gap 371 is crossed whereupon the ears contact the cam surface 782 and are swung around into the trailing position shown. Caps reversely positioned cupped side down, however, will be conveyed past the exit and either recycled on the turntable or spilled into the overfeed duct.

Inasmuch as the apparatus of the invention could be employed in the feeding of various types of unsymmetrical articles for any purpose, its mounting relative to the particular work station fed, as here shown, could also be varied without departing from the scope of the invention. However, FIG. 17 shows one mounting arrangement found to be advantageous and to which the apparatus of the invention particularly lends itself due to its unusual simplicity and compactness. Here a standard crowner turret is indicated at 90 having a plurality of individual cap applying heads 91. The fixed mounting shaft 4, as seen in FIG. 2, is secured to the top of the crowner turret 90 so that the turntable 28 rotates in a horizontal plane directly over and concentric with the turret. The exit track 45 then extends radially outwardly from the turntable and moves downwardly and inwardly terminating in a cap release mechanism 92. Thus caps are conveyed through the exit track 45 and placed on bottles 93 for sealing by the cap applying head 91.

Changes in and modifications of the construction and different embodiments of the invention would suggest themselves to those skilled in the art and could be made without departing from the spirit and scope of the invention. It is accordingly intended that all matter contained in the above description, or shown in the accompanying drawing, shall be interpreted as being illustrative and not in a limiting sense.

Having described our invention what we claim as new and desire to secure by Letters Patent is:

1. The method of orienting and feeding closure caps having a disc-like panel surrounded by a cylindrical wall terminating in a free edge and a radial gripping ear extending outwardly from said free edge away from said panel, comprising the steps of depositing a plurality of such closure caps randomly variously positioned on an upwardly facing surface, subjecting such closure caps to a centrifugal force causing said closure caps to move radially outwardly on said surface, moving said closure caps randomly variously positioned in a generally circular path, selecting closure caps properly positioned with their disc-like panels contacting said surface and collecting said selected caps in side-by-side relationship in an outer circular path, conveying said selected closure caps along said outer circular path to similarly orient all of said selected caps with said gripping ears extending radially inwardly, discharging said oriented selected caps out of said circular path, conveying said caps along another path with said gripping ears similarly oriented in a trailing position, projecting improperly positioned caps radially inwardly from said circular path and reversing the positioning of at least a portion of said caps in said projecting.

2. Apparatus for orienting and feeding closure caps having a disc-like panel surrounded by a cylindrical wall terminating in a free edge and a radial gripping ear extending outwardly from said free edge away from said panel, comprising a circular turntable formed with an upper cap receiving surface, means for depositing caps randomly variously positioned on said surface, motor means for rotating said turntable about its central vertical axis, a circular rail overlying an annular portion of said cap receiving surface, said rail having an undersurface spaced from said cap receiving surface to form a cap cylindrical wall receiving opening, said receiving opening adapted to select closure caps having their disc like panels contacting said cap receiving surface and orient said selected caps with said gripping ears extending radially inwardly, an interruption in said rail to provide for the discharge of closure caps from said receiving surface and means at said interruption overlying said receiving surface for propelling said selected and oriented caps away from said receiving surface with said gripping ears similarly oriented in a trailing position.

References Cited

UNITED STATES PATENTS

| | | | |
|---|---|---|---|
| 2,658,654 | 11/1953 | Schweizer | 53—214 |
| 2,836,947 | 6/1958 | Day | 53—214 |
| 3,012,651 | 12/1961 | Hawkes | 198—33 |
| 3,147,843 | 9/1964 | Freidenrick | 198—33 |

EVON C. BLUNK, *Primary Examiner.*

RICHARD E. AEGERTER, *Examiner.*